United States Patent [19]

Pray

[11] Patent Number: 5,217,253
[45] Date of Patent: Jun. 8, 1993

[54] AIR BAG SYSTEM WITH PASSENGER AIR BAG DOOR HAVING A HINGE RETAINER

[75] Inventor: John H. Pray, Shelby Township, Macomb County, Mich.

[73] Assignee: Allied-Signal Inc., Morristown, N.J.

[21] Appl. No.: 968,905

[22] Filed: Oct. 30, 1992

[51] Int. Cl.⁵ .................................. B60R 21/16
[52] U.S. Cl. ............................ 280/732; 280/728
[58] Field of Search .............. 280/732, 728, 743, 752

[56] References Cited

U.S. PATENT DOCUMENTS

| | | | |
|---|---|---|---|
| 4,893,833 | 1/1990 | DiSalvo et al. | 280/732 |
| 5,060,972 | 10/1991 | Satoh et al. | 280/732 |

FOREIGN PATENT DOCUMENTS

| | | | |
|---|---|---|---|
| 2247214 | 2/1992 | United Kingdom | 280/728 |

*Primary Examiner*—Eric D. Culbreth

[57] ABSTRACT

An apparatus for use in an air bag safety restraint system including: a deployment door (20) having a first part (36, 38, 39) including a tear seam (38) along one side thereof, attached to a cooperating structure (22) to permit the door to open when the tear seam is stressed, a central portion (32) connected to the first part via the tear seam and an integral hinge (42) connected to the central portion (32) and integral therewith. A door retainer bracket (70) is provided with a plurality of lands (72a-72b) and a plurality of rectangular shaped bosses (74a-74c) each boss having a fastener hole (78) therein. The door retainer bracket is fitted to a flange 44 of the cover 20 such that the lands lie against flat portions of the flange (44) and the bosses extend into corresponding rectangular openings 60a-60c of the flange. A door retainer plate (90) is mated against an outward side (80) of the flange 44 and includes fastener openings (94) aligned to the fastener openings (78) in the door retainer bracket (70).

5 Claims, 1 Drawing Sheet

AIR BAG SYSTEM WITH PASSENGER AIR BAG DOOR HAVING A HINGE RETAINER

BACKGROUND AND SUMMARY OF THE INVENTION

The present invention generally relates to air bag safety restraint systems and more particularly to a passenger side air bag restraint system utilizing a deployment door having a hinge retainer.

U.S. Pat. No. 4,893,833 is illustrative of prior art passenger side air bag safety restraint systems utilizing a deployment door having a single hinge and a tearable seam. As is often the case, the deployment door is manufactured utilizing a flexible hinge to permit the door to open upon deployment of an air bag after the tear seam has been broken. To reduce the cost of the deployment door, typically the substrate and the integral hinge are manufactured of a thermal plastic (TPO). The hinge portion of the cover includes a flange having a number of fastener openings which facilitate attachment of the door to a structural component of the vehicle situated just below the instrument panel or alternatively, to a reaction can which typically houses a gas generator and air bag. As it is known, when the air bag deploys, the deployment door is subject to extremely large forces which are transmitted to the hinge and flange upon opening of the door. More specifically, the reaction forces are absorbed by the flange at the interface of the fasteners and the fastener holes. Depending upon the magnitude of the deployment forces acting on the door, a fracture or fractures could be created in the hinge flange.

It is an object of the present invention to provide an improved mechanism to retain a deployment door to a cooperating structure. Accordingly, the invention comprises: an apparatus for use in an air bag safety restraint system comprising: a deployment door comprising a first part, which may include a tear seam along one side thereof, attached to a cooperating structure to permit the door to open when the tear seam is stressed, a central portion connected to the first part and a hinge means connected to the central portion and integral therewith. The apparatus includes a door retainer bracket comprising a plurality of lands and a plurality of bosses each boss having a fastener hole therein. The door retainer bracket is fitted to a flange of the cover such that the lands lie against flat portions of the flange and the bosses extend into corresponding openings of the flange and lie generally parallel to an opposite side of the flange.

A door retainer plate is mated against the other side of the flange including fastener openings aligned to the fastener openings in the door retainer bracket and fastener means extend through the fastener openings for attaching the door retainer bracket, flange and door retainer plate to the cooperating structure.

Many other objects and purposes of the invention will be clear from the following detailed description of the drawings.

DETAILED DESCRIPTION OF THE DRAWINGS

Figure 1:
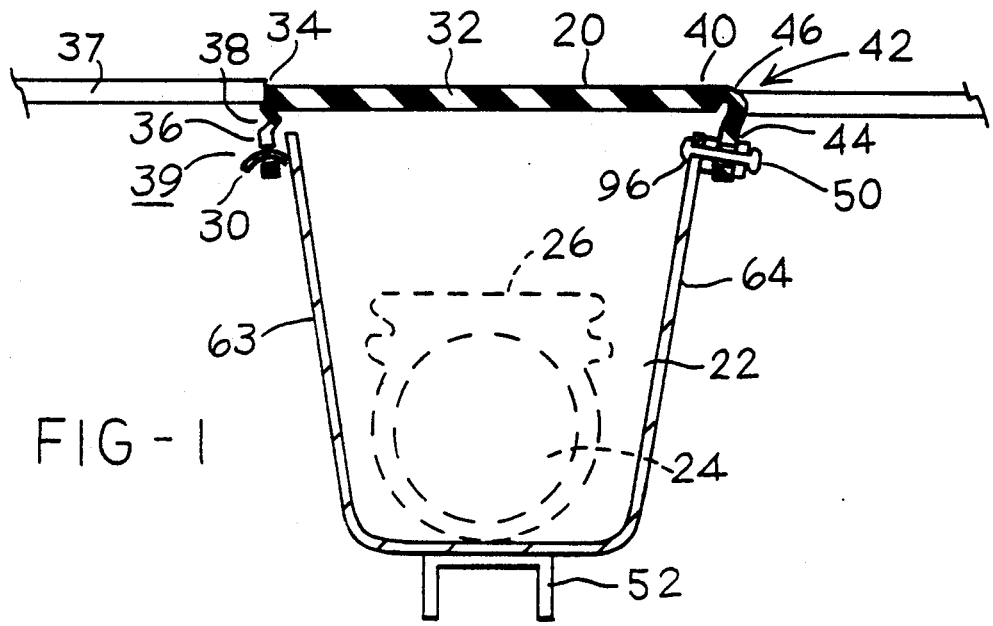
FIG. 1 illustrates a cross-sectional view illustrating a typical deployment door connected to a reaction can.

Reference is made to FIG. 1 which illustrates a deployment door 20 connected to a reaction can 22. As is known in the art, the reaction can typically houses a gas generator 24 and an air bag 26 folded thereabout. The gas generator and air bag are illustrated in phantom line. The reaction can 22 includes a plurality of hooks 30, preferably three, extending from side 63 which engage a flange portion 36 of the door 20 that includes three slots 39. As can be seen from FIG. 1, the door comprises a central portion 32. Situated at one end 34 is a flange 36 extending from the central portion. A tear seam 38 interposes the flange 36 and central portion 32 of the cover 20. Situated on the other side 40 of the cover 20 is a hinge element 42 comprising a flange 44 and hinge 46. As illustrated in FIG. 1, the deployment door 20 has been shown as an integral plastic element or substrate having the tear seam 38 at one end and a hinge element 42 at another end. Depending upon the construction of the door, and as is known in the art, the plastic element or substrate can be covered by a foam and skin construction to more exactly match the construction of adjacent portions of the instrument panel or other vehicle member 37 in which the door is received.

Figure 2:
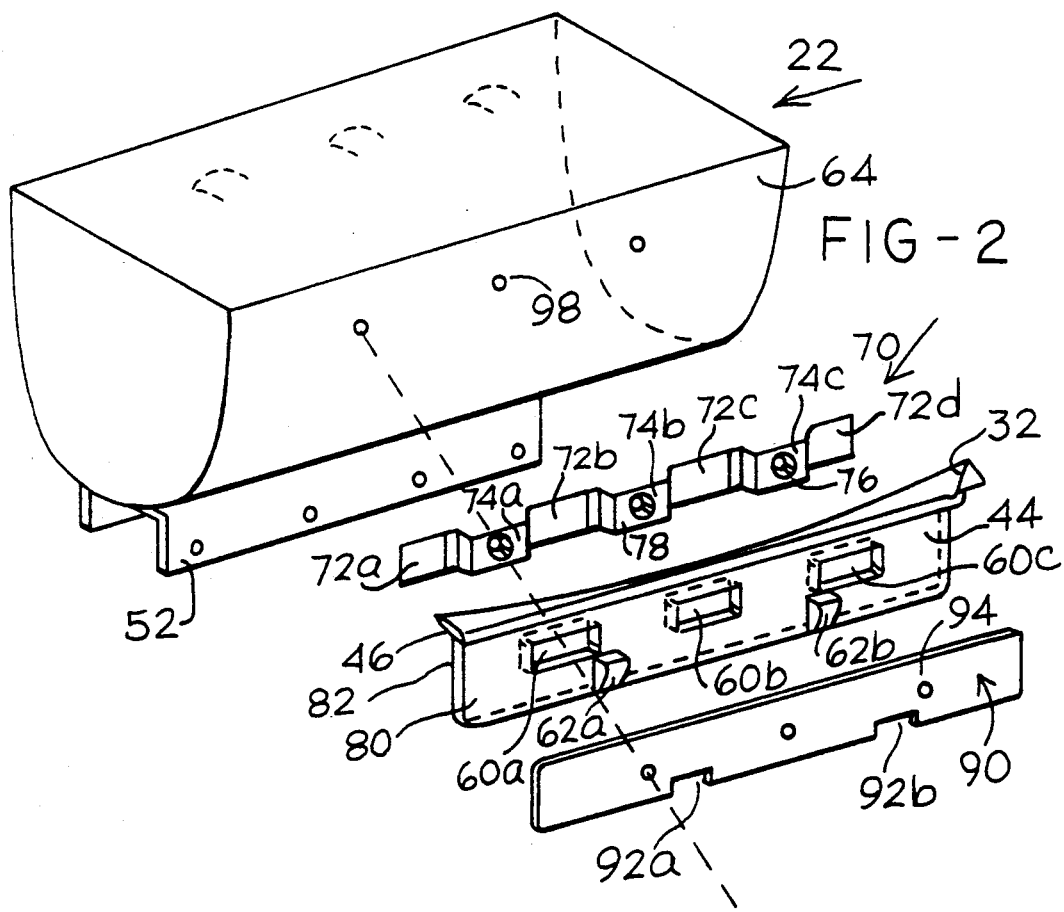
FIG. 2 shows a projected view illustrating additional components used to attach the door to the reaction can.

Reference is now made to FIG. 2 which illustrates an assembly view showing the reaction can 22 and the right hand portion of the deployment door showing the flange 44 and a part of the center portion 32 of the deployment door 40. A bracket 52 is used to connect or attach the reaction can to a cooperating structure situated below the instrument panel 37 of the vehicle. The flange 44 includes a plurality of openings 60a–60c and a plurality of projections 62a and 62b integrally formed as part of the flange 44. Positioned between the flange and a side 64 of the reaction can 22 is a door retainer bracket generally shown as 70. The retainer bracket comprises a plurality of flat land 72a–d and a plurality of bosses 74a–c. Each boss includes a fastener opening such as 76. Upon assembly, the door retainer bracket 70 is fitted to the flange 44 such that each of the bosses 74a–d fit within a corresponding one of the openings 60a–c with the flat portion 78 of each boss positioned essentially coplanar with a first side 80 of the flange 44. With bosses 74a–c so positioned the flats 72a–d lie against the flat portion of an opposite side 82 of the flange. A door retainer plate generally shown as 90, having a generally flat construction, and including a plurality of grooves 92a and 92b is placed against the side 80 of the flange with the projection 62a and 62b fitting within the grooves 92a and 92b locating same. As can be seen, the projections properly locate the plate relative to the flange 44. Other locating means are within the scope of the present invention. The door retainer plate also includes a plurality of fastener openings such as 94. The door retainer bracket 70, flange 44, and door retainer plate 90 are fastened to the side 64 of the reaction can 22, as shown in FIG. 1, by a plurality of fasteners 50 which fit through the various fastener holes 94 and 96 and into like fastener holes 98 fabricated with the side 64 of the reaction can 22.

The assembly of the door 20 to the reaction can 22 in the following manner. The flange 36 having slots 39 is first positioned onto the reaction can 22 with the hooks 30 entering the corresponding one of the slots 39. Thereafter the flange 44 is attached to side 64 of the reaction can in the manner described above. It should be appreciated from the above that the door retainer bracket 70 and door retainer plate 90 in association with the openings 60a-60c provide a means by which the flange end of a deployment door 20 can be attached to a cooperating structure in a manner to more evenly distribute the reaction forces generated upon deployment of the air bag and subsequent tearing open of the deployment door 20.

Many changes and modifications in the above described embodiment of the invention can, of course, be carried out without departing from the scope thereof. Accordingly, that scope is intended to be limited only by the scope of the appended claims.

I claim:

1. An apparatus for use in an air bag safety restraint system comprising: a deployment door (20) comprising a first part (36, 38, 39) attached to a cooperating structure (22) to permit the door to open when the stressed upon deployment of the air bag, a central portion (32) connected to the first part and hinge means (42), including a flange (44), connected to the central portion (32) and integral therewith;

a door retainer bracket (70) comprising a plurality of lands (72a–72d) and a plurality of bosses (74a-74c) each boss having a fastener hole (78) therein, the door retainer bracket fitted to the flange (44) such that the lands lie against flat portions on one side of the flange (44) and the bosses extend into corresponding openings (60a-60c) of the flange and lie generally parallel to an opposite side (80) of the flange (44);

a door retainer plate (90) mated against the other side (80) of the flange (44) including fastener openings (94) aligned to the fastener openings (78) in the door retainer bracket (70);

fastener means (50) extending through each of the fastener openings for attaching the door retainer bracket, flange and door retainer plate to the cooperating structure.

2. The apparatus as defined in claim 1 wherein the cooperating apparatus comprises an air bag housing (22) including a first wall (64) to which the door retainer bracket is mounted.

3. The apparatus as defined in claim 2 wherein the air bag housing includes a second wall (63) opposite the first wall (64) comprising a plurality of tabs extending therefrom and wherein the first part of the door includes a like plurality of slots (39) and wherein the door is mounted to the air bag housing by positioning each through a corresponding one of the slots.

4. The apparatus as defined in claim 1 wherein the flange includes means for positioning the door retainer plate in a proper alignment such that the fastener openings in the door retainer plate are aligned to the fastener openings in the door retainer bracket.

5. The apparatus as defined in claim 1 wherein the openings in the flange are rectangularly shaped and the bosses are similarly rectangularly shaped.

* * * * *